P. A. GAALAAS.
ARMATURE TESTER.
APPLICATION FILED SEPT. 20, 1920.
1,412,051.       Patented Apr. 11, 1922.
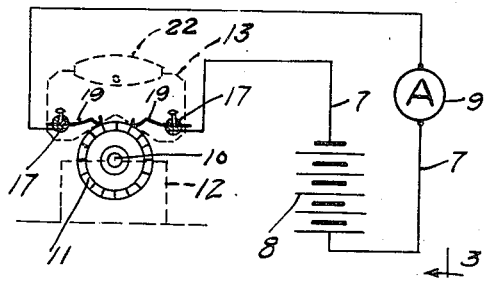
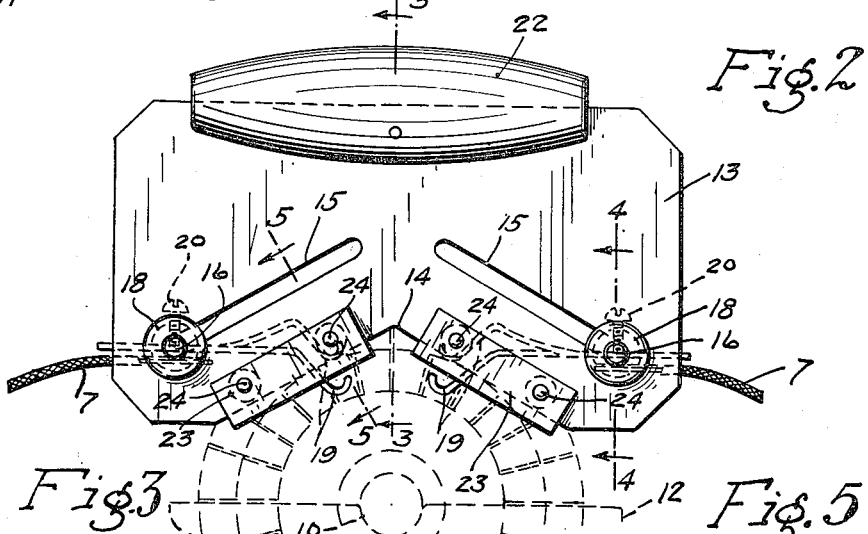
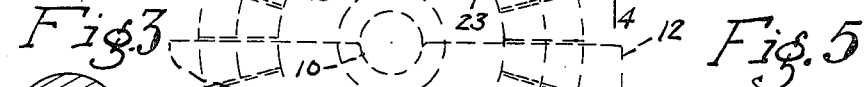
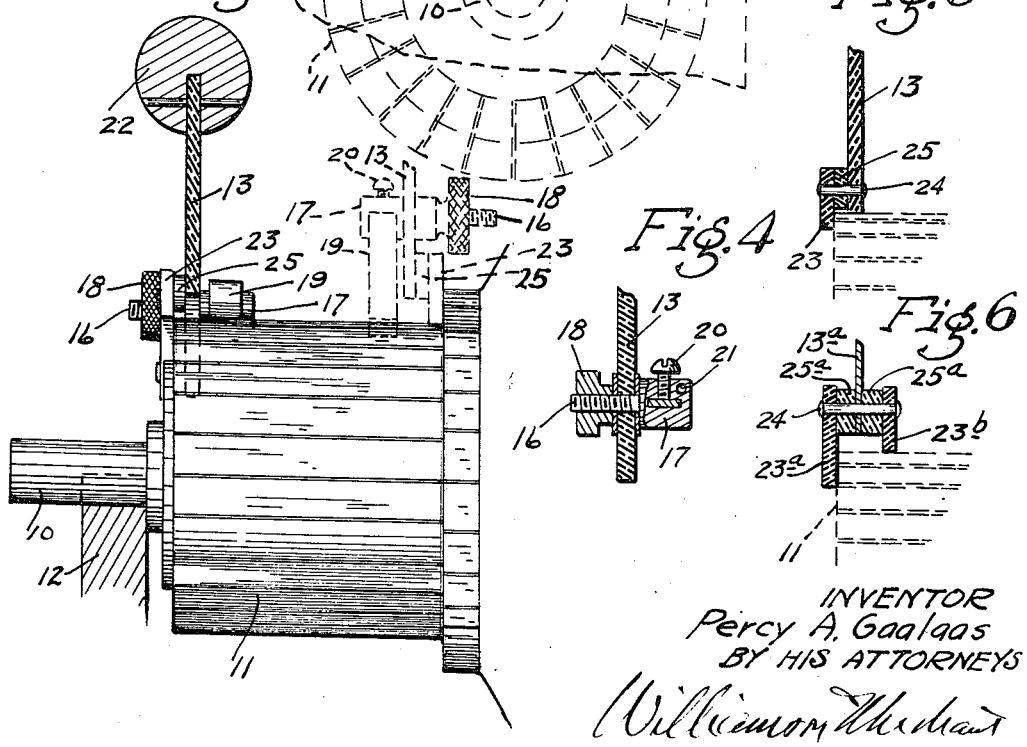
INVENTOR
Percy A. Gaalaas
BY HIS ATTORNEYS

UNITED STATES PATENT OFFICE.

PERCY A. GAALAAS, OF MINNEAPOLIS, MINNESOTA.

ARMATURE TESTER.

1,412,051.   Specification of Letters Patent.   Patented Apr. 11, 1922.

Application filed September 20, 1920. Serial No. 411,493.

*To all whom it may concern:*

Be it known that I, PERCY A. GAALAAS, a citizen of the United States, residing at Minneapolis, in the county of Hennepin and State of Minnesota, have invented certain new and useful Improvements in Armature Testers; and I do hereby declare the following to be a full, clear, and exact description of the invention, such as will enable others skilled in the art to which it appertains to make and use the same.

My invention has for its object to provide an extremely simple but highly efficient armature tester that may be quickly and conveniently used both by inexperienced and experienced persons in accurately testing armatures for short circuits, open circuits and grounds.

Generally stated, the invention consists of the novel devices and combinations of devices hereinafter described and defined in the claims.

The complete armature tester includes, in addition to the electric circuit with an ammeter, a contact carrying plate adapted to be held in the hand, or otherwise supported and provided with armature engaging contacts and co-operating devices in a novel arrangement thereon.

The invention, in its preferred form, designed as a portable device, is illustrated in the accompanying drawings, wherein like characters indicate like parts throughout the several views.

Referring to the drawings:

Fig. 1 is a diagrammatic view of the tester illustrating the action thereof on an armature commutator;

Fig. 2, by full lines, shows the tester plate or frame and cooperating devices carried thereby, and by dotted lines also indicates an armature commutator;

Fig. 3 is a section on the line 3—3 of Fig. 2, but showing an armature commutator in full elevation;

Fig. 4 is a section on the line 4—4 of Fig. 2;

Fig. 5 is a detail in section on the line 5—5 of Fig. 2; and

Fig. 6 is a section corresponding to Fig. 5, but illustrating a slightly modified construction.

The tester circuit includes the customary lead 7, a battery 8, and ammeter 9, and certain contacts presently to be described which are mounted on the so called tester plate. Here it may be stated that for testing voltage a rheostat may be inserted in the circuit or by adjustable clips to leads that are connected to different battery plates, in a manner well understood.

The numeral 10 indicates an armature shaft and the numeral 11 the sections of the armature commutator, as is customary in testing armatures its shaft may be suitably supported on bearings 12.

In the preferred form of the device the tester plate or frame 13 is made from a flat piece of insulating material such as vulcanized wood fibre; and this plate on one edge is formed with a large V-shaped notch 14, and in its body is formed with longitudinal diverging slots 15 that are preferably parallel to the adjacent edges of the V-shaped notch or reentrant cut 14.

Contact screws or bolts 16 having large heads 17 work adjustably in the slots 15 and are provided with clamping nuts 18, by means of which they may be set in different adjustments on the plate 13. The heads 17 have diametrical slots through which the flat ends of contact brushes 19 are arranged to work with freedom for longitudinal adjustment, but are adapted to be rigidly held to said heads by screws 20.

The circuit leads 7 are connected to each of the heads 17, the latter preferably having perforations 21 through which or into which the leads are extended and held by a solder, friction or any other suitable means.

The plate 13 is shown as of approximately rectangular general outline, and is provided with a hand piece 22, secured to its upper or outer edge, so that the said plate may be conveniently held in the hand.

The numeral 23 indicates gauge strips that are rigidly secured to the plate 13, preferably by rivets 24, but are spaced therefrom by spacing strips 25. Preferably both the gauge strips 23 and spacing strips 25 are also of vulcanized wood fiber, but may be of other suitable material. The outer edges of the gauge strips 23 project beyond but are parallel to and laterally offset from the respective edges of the notch or re-entrant V-shaped cut 14, this being done for important purposes.

Before going into description it is obvious that the contact brushes 19 are capable not only of endwise sliding adjustments through the heads 17 but also of pivot adjustments on the axes of the respective heads 17 and the screws 16.

When an armature is to be tested for open or short circuits between commutator segments that are quite close to each other, the contact brushes 19 will be adjusted substantially as shown in Figures 1 and 2 and then the armature may be tested by applying plate 13 with the V-shaped notch 14 on the peripheral surface of the commutator and with the gauge plates 22 bearing lightly against the outer ends of the adjacent commutator segments. Before the device is pressed down on the commutator the free ends of the brushes 19 will project as shown by full lines in Fig. 2, but when the plate is pressed down against the commutator and the free ends of the contact brushes 19 are pressed tightly against certain of the commutator segments, said brushes will be sprung into position substantially as indicated by the upper dotted lines in Fig. 2. This being done the commutator is to be rotated while the tester plate is held stationary or of course the tester plate may be moved around the commutator. This will test for open or short circuit between closely adjacent commutator segments.

The second test for open or short circuit is made by setting the contact brushes 19 about at the relative positions of the commutator brushes of the generator, to-wit, on quarters, or at diametrically opposite points. This adjustment of the brushes 19 may be readily accomplished by adjusting the same either endwise or pivotally, or both, and the manner of applying the device for testing the tester will then be substantially as before described.

Some commutators are of such construction that they can be better tested by applying the device on the commutator close to its risers as indicated by dotted lines, but the testing of the armature will be as before described.

The third test, to-wit, for grounds in the armature may be made by turning one of the contact brushes 19 into an inoperative position, connecting the circuit lead hitherto connected to said brush to the armature shaft and then applying the device so that the other or operating contact brush 19 will engage in succession with the commutator segments.

In the modified form shown in Figure 6, the plate 13ª which corresponds to the plate 13, is assumed to be made of sheet metal and in this arrangement, as illustrated, in addition to the gauge plates 23ª and spacing plate 25ª, a narrower inside gauge plate 23ᵇ and spacing plate 25ª are secured to the plate 13ª along the edges of the V-shaped notch by means of rivets 24. In this modified construction, said elements 23ª, 25ª, 23ᵇ, and 25ª are of insulating material, such as vulcanized wood fiber.

The advantages of this tester, briefly summarized, are as follows: Any person, whether expert, or not, can quickly and accurately test a generator armature.

The device is a time saver for experts and almost a necessity for those who are inexperienced in the testing of armatures.

The device can be very quickly adjusted for the different required tests above described.

The device is of but small cost and cannot be easily injured as it has no delicate or fragile parts which require either delicate handling or close adjustment.

And, finally it is as efficient for testing armatures as any of the highest priced instruments and has the advantage of small cost, quick manipulation and ability to withstand rough handling.

This tester in actual practice has been found especially valuable to use in testing automobile generator armatures, but of course is not limited to that or any other particular use, except for the general use above indicated.

What I claim is:

1. An armature tester including a supporting plate having a commutator engaging notch and provided with contact brushes with ends projecting in the vicinity of said notch for engagement with commutator segments.

2. An armature tester including a supporting plate having a commutator engaging notch and provided with contact brushes with ends projecting in the vicinity of said notch for engagement with commutator segments, and gauge plates applied to, but offset from the said supporting plates, the lower edges of which are parallel to the edges of the notch of said plate, but projecting beyond the same.

3. An armature tester including a supporting plate having a commutator engaging notch and provided with contact brushes with ends projecting in the vicinity of said notch for engagement with commutator segments, and gauge plates applied to, but offset from said supporting plates, the lower edges of which are parallel to the edges of the notch of said plate, but projecting beyond the same, said gauge plates being on one side, and said brushes being on the other side of said supporting plate.

4. An armature tester including a supporting plate having a commutator engaging notch and provided with contact brushes with ends projecting in the vicinity of said notch for engagement with commutator segments, said supporting plate being of insulating material.

5. An armature tester including a supporting plate having a commutator engaging notch and provided with contact brushes with ends projecting in the vicinity of said notch for engagement with commutator segments, said contact brushes being endwise adjustable.

6. An armature tester including a supporting plate having a commutator engaging notch and provided with contact brushes with ends projecting in the vicinity of said notch for engagement with commutator segments, said contact brushes being mounted on said plate, being endwise and pivotally adjustable.

7. An armature tester comprising the supporting plate, having a V-shaped commutator engaging notch at one edge and having slots that extend practically parallel to the edges of said notch, headed nut equipped screws adjustably mounted in the slots of said plate, contact brushes secured to the heads of said screws, and supported thereby, for endwise and pivotable adjustments, laterally off-set gauge plates applied to said supporting plate, secured to said supporting plate and projecting beyond the edges of the notch thereof and circuit terminals connected to said screws and adjustable therewith.

In testimony whereof I affix my signature.

PERCY A. GAALAAS.